United States Patent [19]

Frater et al.

[11] 4,443,824

[45] Apr. 17, 1984

[54] MAGNETIC HEAD ARM ASSEMBLY

[75] Inventors: Norman K. Frater; Gregory G. Gill; Robert B. Watrous, all of San Jose, Calif.

[73] Assignee: International Business Machines Corporation, Armonk, N.Y.

[21] Appl. No.: 301,499

[22] Filed: Sep. 14, 1981

[51] Int. Cl.³ .............................................. G11B 5/48
[52] U.S. Cl. .................................................. 360/104
[58] Field of Search ....................... 360/104, 102–103, 360/105–106, 128

[56] References Cited

U.S. PATENT DOCUMENTS

| | | | |
|---|---|---|---|
| 3,786,457 | 1/1974 | Kahn | 360/104 |
| 3,931,641 | 1/1976 | Watrous | 360/104 |
| 4,120,010 | 10/1978 | Mitsuya et al. | 360/103 |
| 4,268,879 | 5/1981 | Watrous | 360/104 |
| 4,286,297 | 8/1981 | Root et al. | 360/104 X |
| 4,387,409 | 6/1983 | Otavsky et al. | 360/104 |

FOREIGN PATENT DOCUMENTS 56-159864  9/1981  Japan ................................. 360/104

OTHER PUBLICATIONS

IBM/TDB, vol. 19, No. 5, Oct. 1976, pp. 1859–1860, "Transducer Assembly to Ciruit–Board Interconnect" by Burns et al.

Primary Examiner—John H. Wolff
Attorney, Agent, or Firm—Nathan N. Kallman; Henry F. Otto, Jr.

[57] ABSTRACT

A magnetic head arm that supports suspensions and head sliders is formed as an integral die cast rigid structure having two coextensive C-shaped channels along the sides terminating in a thick base. Bridge elements formed between the two channels support the head suspensions and sliders. Apertures in the walls of the channels provide air flow for cooling, and serve to reduce mass thereby enabling faster access to data tracks.

7 Claims, 4 Drawing Figures

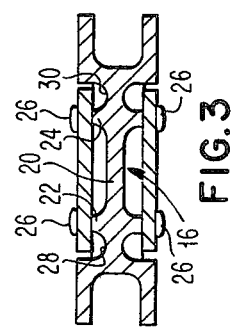
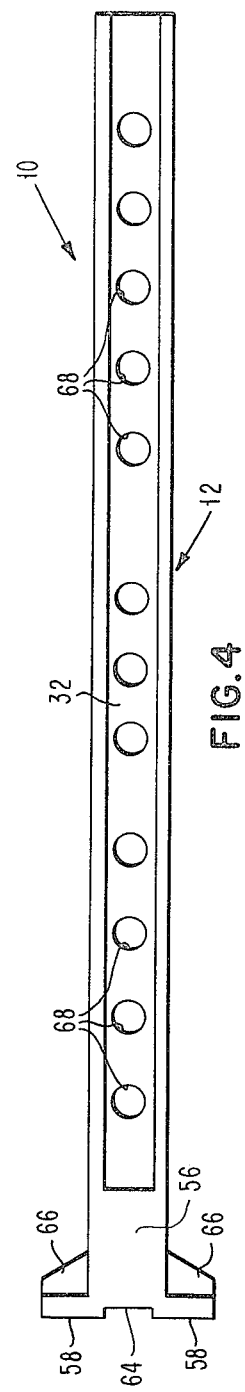

MAGNETIC HEAD ARM ASSEMBLY

DESCRIPTION

1. Technical Field

This invention relates to a magnetic head arm assembly, such as used in disk storage systems.

An object of this invention is to provide a magnetic head arm assembly that has a high strength to weight ratio.

Another object of this invention is to provide a magnetic head arm assembly having advantageous air flow for cooling electronic modules mounted to the arm.

A further object of this invention is to provide a magnetic head arm assembly that allows simplified mounting of the arm to an actuator or carrier.

A further object is to provide a magnetic head arm that allows accurate machining of flat mounting surfaces.

2. Background Art

Presently known magnetic disk storage systems employ head access arms that support suspension elements to which head sliders and transducers are attached. One or more electronic circuit modules are joined to a surface of the arm. Generally, the arm is formed from flat metal stock to provide stiffness. However, the relatively large mass of metal used to form the arm deleteriously affects the accessing time of the heads. Also, the electronic circuitry incorporated with the arm generates heat that results in variations of the dimensional relationship of the arm and the adjacent rotating magnetic disk. If not properly dissipated, this heat also shortens the life of the electronic circuitry. Such changes are known to cause misregistration of the magnetic head relative to a specified data track on the disk surface.

BRIEF DESCRIPTION OF THE DRAWINGS

The invention will be described with reference to the drawings in which:

FIG. 3 is a section view taken across line 3-3 of FIG. 1, illustrating a bridge element formed with the head arm of this invention.

FIG. 4 is a side view of the head arm.

DESCRIPTION OF A PREFERRED EMBODIMENT

Figure 1:
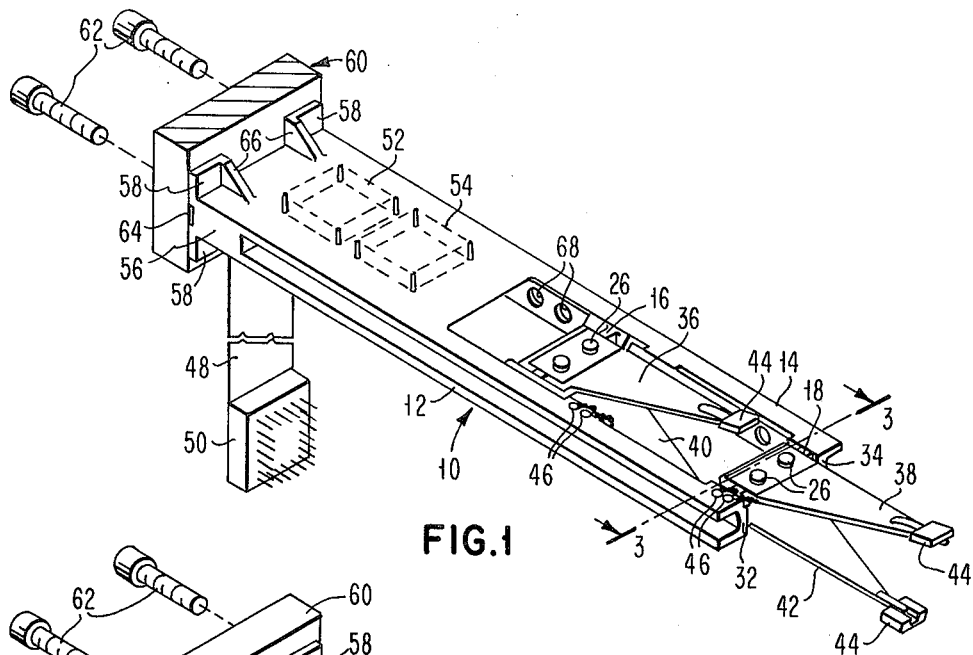
FIG. 1 is a perspective view, partly exploded, of a magnetic head arm assembly, made in accordance with this invention.

With reference to FIG. 1, a magnetic head arm 10 is formed as an integral die cast structure, made preferably of a material such as aluminum alloy 518, a commercially available alloy. This alloy has a coefficient of thermal expansion that closely matches that of magnetic recording disks commonly used in disk files. The arm is cast with spaced parallel C-shaped channels 12 and 14 extending longitudinally along each side of the arm structure, and with transversely disposed bridge elements 16 and 18 connecting the walls of channels 12 and 14.

The configuration of the bridge element 16 or 18 is depicted in FIG. 3. The bridge element, which is formed during the die casting of the arm and is an integral portion of the arm 10, has a thin central rib 20 that connects two solid bosses 22 and 24. The bosses have threaded apertures at each end which engage opposing screws 26. The screws 26 close the apertures so that no contaminant particles can escape from the threaded areas into the environment of the head arms and head/disk assembly in which they are located. The bridge element terminates in U-shaped sections 28 and 30 that are attached respectively to the walls 32 and 34 of the C-shaped channels 12 and 14.

Spring suspensions 36 and 38 are attached respectively to the tops of the bridge elements 16 and 18, and similar spring suspensions 40 and 42 are attached respectively to the bottoms of the bridge elements. The spring suspensions are fastened to the bridge elements by the screws 26 that engage the threaded holes in the bosses 22 and 24.

Each suspension respectively supports at its end a head slider 44 with magnetic transducer means. Each head slider has one or more transducers disposed so that the transducing gaps of the heads may be in transducing relation with magnetic disk surfaces.

Electrical signal leads from the heads are connected to terminals 46. A cable assembly 48 has leads that connect to the terminals 46 at one end and to a plug connector assembly 50 at the other end. Electronic circuit modules 52 and 54 are fixed to the arm 10 for connection to the cable leads to achieve amplification and processing of the signals passing through the heads.

The die cast arm structure terminates in a thick base 56 having alignment tabs 58 at one end. The configuration of the thick base and alignment tabs provides accurately machined flat surfaces to which a head carrier 60 is mounted. The arm 10 is joined to the carrier 60 by means of threaded screws 62 that pass through the carrier and through a recess 64 in the base 56 to engage threaded apertures formed in the base 56 (see FIG. 4). The recess 64 concentrates the contact force between the arm and the carrier in discrete areas at the extremity of the mounting surface. Only two screws 62 are required to produce a rigid mounting of the arm to the carrier. The recess 64 also prevents distortion in the threaded area from disturbing the flat contact areas.

Figure 2:
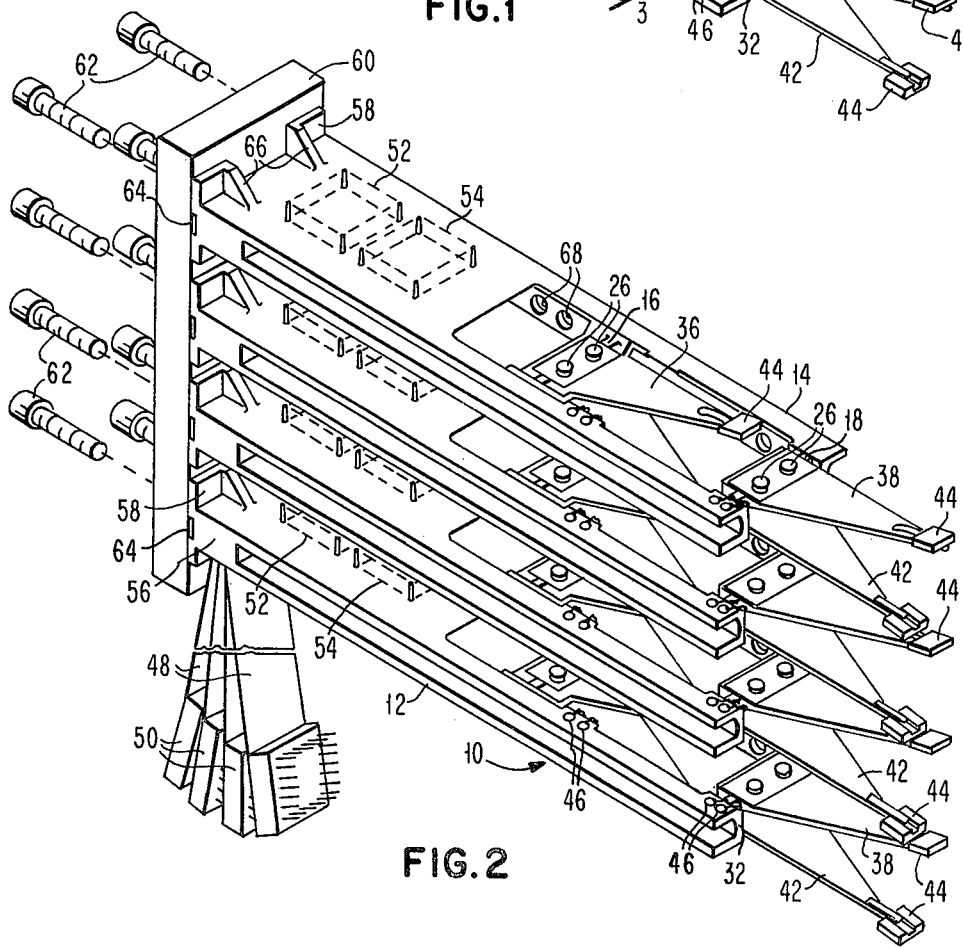
FIG. 2 is a perspective view of a plurality of magnetic head arms, such as depicted in FIG. 1, attached to a carrier plate.

The surfaces of the alignment tabs 58 are precision aligned in a common plane to accept the machine finished surface of the carrier 60 in close relation. As illustrated in FIG. 2, the carrier supports a plurality of arms 10 that are precisely aligned for accessing a plurality of concentric disk surfaces arranged in a stack. The carrier 60 is coupled to an actuator, such as a voice coil motor (not shown), which moves the assembly of arms and heads for accessing the record disks, as is known in the art.

Triangular gussets 66 serve to stiffen the arm without adding significant weight, and in conjunction with the thick base, provide substantial strength to the arm structure.

To reduce the mass of the die cast arm 10, a series of apertures 68 are formed in the walls 32 and 34 of the channels 12 and 14. The apertures 68 also allow air flow through the arm, thereby cooling the electronic circuit modules 52 and 54.

The design disclosed herein allows for precision flat machining and for the holding of accurate tolerances necessary for the precise location of the several head suspension assemblies. The opposing screws in the solid bosses serve to trap loose burrs or particles that may appear as a result of drilling and tapping for threading the screws that hold the suspension assemblies to the arm. The use of a cast arm improves production output and yield, and eliminates or minimizes design problems inherent with prior art head/arm assemblies.

What is claimed is:

1. A magnetic head-arm assembly for use in a disk file apparatus for supporting a plurality of magnetic transducers, said assembly comprising;

a unitary, substantially flat, generally rectangular arm having an opening adjacent one longitudinal end to form two spaced legs joined by a plurality of integrally formed transversely extending bridges, and channels formed in the opposite longitudinal sides of the arm to minimize mass for improving access time;

suspension members secured by screws to both the upper and lower sides of each bridge for operatively supporting a respective magnetic transducer; and at least one electronic circuit module connected to at least one of the flat surfaces of said arm adjacent its opposite longitudinal end, each of said channels having at least one aperture communicating with the opening in said arm to allow air to flow through the arm for cooling each circuit module.

2. A magnetic head-arm assembly for use in a disk file apparatus for supporting at least one magnetic transducer, said assembly comprising:

a unitary, substantially flat, generally rectangular arm having (a) an opening adjacent one longitudinal end to form two spaced legs joined by at least one integrally formed bridge, and (b) channels formed in the opposite longitudinal sides of the arm to minimize mass while providing requisite stiffness, for thereby improving access time;

at least one suspension member secured to each bridge for operatively supporting a respective magnetic transducer; and at least one electronic circuit module connected to at least one of the flat surfaces of said arm adjacent its opposite longitudinal end;

each of said channels having at least one aperture communicating with the opening in said arm to allow air to flow through the arm for cooling each circuit module.

3. A magnetic head-arm assembly according to claim 2 for mounting to a carrier, including alignment tabs at said opposite longitudinal end of and formed integrally with said arm and extending perpendicularly from the opposing flat surfaces of the arm for positioning the arm against the carrier.

4. A magnetic head-arm assembly according to claim 3, including at least one cable assembly and plug connector assembly electrically connected to each module.

5. An array comprising a plurality of magnetic head-arm assemblies as in claim 3 arranged in vertically offset relation and each mounted to the same carrier.

6. A magnetic head-arm assembly according to claim 2 for mounting to a carrier, said arm having, integrally formed therewith and at the opposite longitudinal end thereof, alignment tabs and reinforcing gussets extending in opposite directions from each of the flat surfaces of the arm, and a shallow recess provided in said opposite end to concentrate the contact force at the tabs when the arm is secured to the carrier.

7. A magnetic head-arm assembly according to claim 2 for reading magnetic indicia from a magnetic recording disk, wherein the arm is formed of a material having a coefficient of thermal expansion that closely matches that of the magnetic recording disk.

* * * * *